United States Patent [19]
Gleeman

[11] Patent Number: 6,075,714
[45] Date of Patent: Jun. 13, 2000

[54] REGULATED DRIVE FOR VIBRATORY FEEDERS

[75] Inventor: Alan N. Gleeman, Mountain View, Calif.

[73] Assignee: American Dental Technologies, Inc., Southfield, Mich.

[21] Appl. No.: 08/866,164

[22] Filed: May 30, 1997

[51] Int. Cl.[7] .................................................. H02M 3/335
[52] U.S. Cl. .............................. 363/21; 363/97; 318/114
[58] Field of Search .............................. 363/21, 97, 131, 363/143; 318/114, 129, 134

[56] References Cited

U.S. PATENT DOCUMENTS

| | | | |
|---|---|---|---|
| 4,144,480 | 3/1979 | Nagasaki et al. | 315/411 |
| 4,471,418 | 9/1984 | Tuma | 363/21 |
| 4,949,312 | 8/1990 | Iwasawa | 367/7 |
| 5,656,896 | 8/1997 | Ogiwara et al. | 318/114 |
| 5,754,016 | 5/1998 | Jovanovic et al. | 318/118 |
| 5,757,629 | 5/1998 | Yntema et al. | 363/21 |
| 5,761,055 | 6/1998 | Okada et al. | 363/21 |

*Primary Examiner*—Peter S. Wong
*Assistant Examiner*—Derek J. Jardieu
*Attorney, Agent, or Firm*—Synnestvedt & Lechner LLP

[57] ABSTRACT

A vibratory device having a drive circuit for providing a highly regulated drive voltage/current to the vibrator. A DC voltage is derived from line voltage. A DC-to-DC converter steps up the voltage to at least the desired voltage for vibration. The stepped up DC voltage is provided to the vibratory coils through a path containing a switch. The switch is controlled by an oscillator which turns the switch on and off at a desired vibration frequency so as to provide an alternating current through the coil for generating the vibratory force.

22 Claims, 5 Drawing Sheets

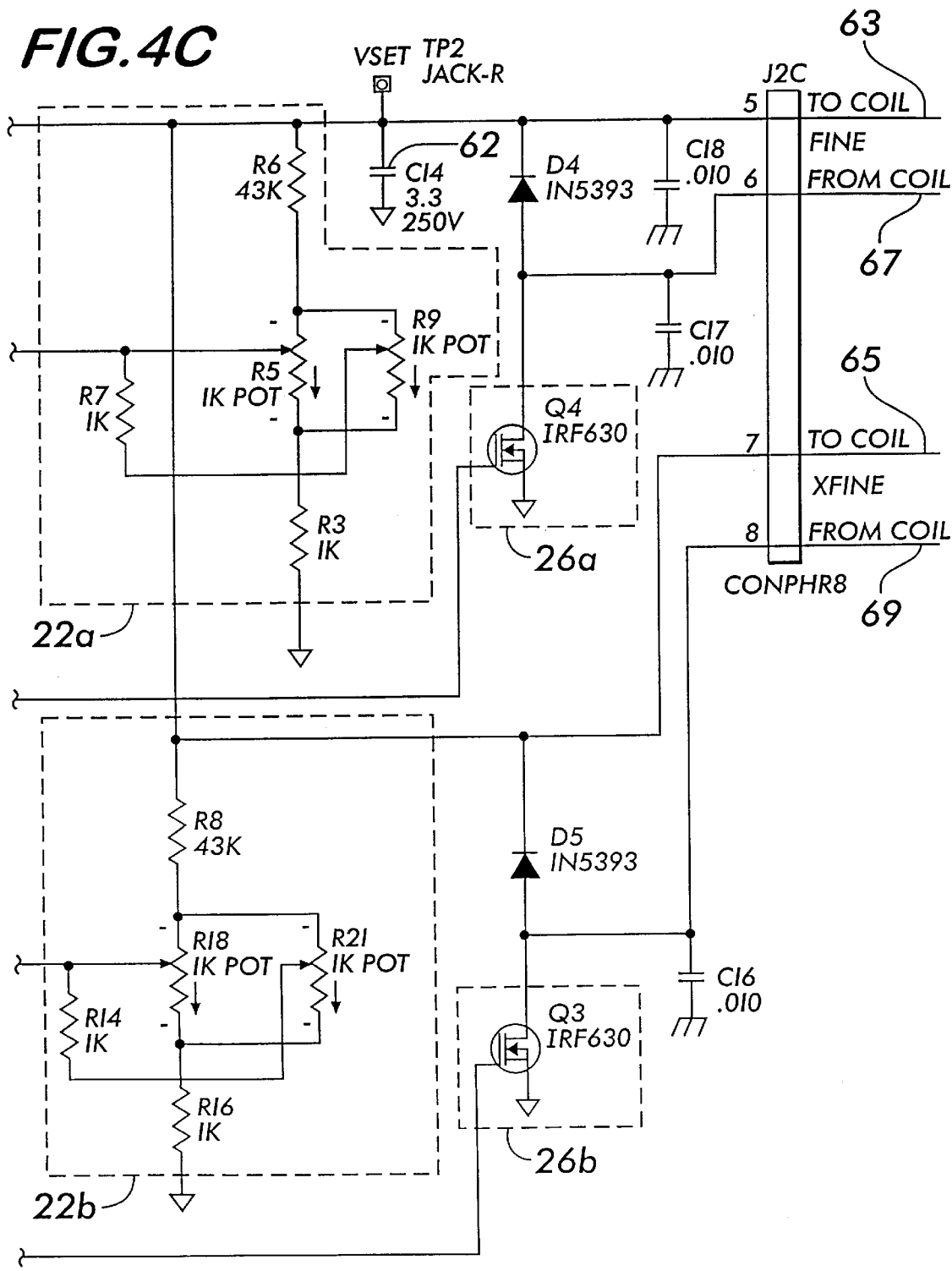

ns of them to switch 191 so

REGULATED DRIVE FOR VIBRATORY FEEDERS

FIELD OF THE INVENTION

The present invention relates to drive circuits for vibratory feeders. More particularly, the present invention relates to improved drive circuits for providing signals of constant voltage and frequency for driving vibratory feeders.

BACKGROUND OF THE INVENTION

There are a substantial and varied number of industrial and non-industrial uses for precision vibratory instruments. For instance, vibrating belts and platforms are used in packaging and manufacturing plants for assisting in the separation of mass produced goods or parts. Further, there are many types of vibratory tools which require drivers which can provide very precise frequency and voltage/current for controlling vibration. One such tool for which the present invention is particularly adapted is a dental air-abrasive tool. The tool basically comprises a system for delivering an abrasive laden stream of pressurized air through a nozzle. The abrasive laden air stream is used to cut, excavate or etch teeth. At lower delivery pressures, it also can be used for cleaning teeth. Different delivery pressures and/or abrasive particle delivery rates are used for different applications. Thus, it can be seen that the delivery rate of abrasive particles, i.e., particles per unit volume or particles per unit time must be precisely controlled for the tool to operate well in a given application.

In operation, abrasive particles are fed from a chamber into a pressurized air stream. The abrasive laden air stream is delivered to the teeth through a hand-held nozzle assembly. FIG. 1 illustrates an exemplary system for delivering the abrasive into the air stream. The system includes a sealed lower chamber 175 mounted on a base 176 and an abrasive powder supply vessel 177 which is bolted or otherwise fastened to the top of chamber 175. Located within chamber 175 is an upwardly open cylindrical particle feed receptacle 178 which is mounted on a vibratory device 179, as particularly described in U.S. Pat. No. 4,708,534, which is incorporated herein by reference. Cylindrical feed receptacle 178 is provided on its inner surface with a helical feed groove 180, the lower end of which communicates with the bottom of the cylinder and the top of which is in communication with a feed tube 181 which delivers the particulate material through a section of resilient, flexible tubing 182 to an exit tube 183 which passes through the wall of vessel 175. Joined to tube 183 is a second section of resilient flexible tubing 184 which is in turn connected to a duct 172 through which pressurized air is flowing to the nozzle 108 of a handpiece 107.

Powder supply receptacle 177 is adapted to receive and contain a supply of abrasive particulate matter, generally indicated by the reference character P and to supply the same in a uniform manner to the bottom of cylindrical feed device 178 through a feed tube 186 in a manner more particularly described in the aforementioned U.S. Pat. No. 4,708,534.

In order to bring the powder delivery system up to a pressure at which it is primed for operation, air under pressure, for example, about 80 psi, is delivered to chamber 175 by way of a connection 187 which is connected to line 160 which is pressurized upon closure of a valve (not shown). A branch conduit 188 also supplies air at the same pressure to the powder supply chamber 177 by means of a connection 187 which communicates with the interior of the supply chamber.

Vibratory device 179 is an electrically operated device which is preferably activated off handpiece 107. In general, the rate of vibratory feed is controlled by way of an adjustable control device 190 mounted on the equipment control panel in a convenient location. Device 190 may be set manually by the operator to a desired vibratory rate or optionally may be a pressure responsive device which automatically adjusts through connections to switch 191 so that an appropriate rate is provided for the operating pressure level as selected on switch 191.

The abrasive delivery system is also preferably provided with a normally closed pinch valve 192. Pinch valve 192 is controlled by a solenoid 193 either directly or through a fluid pressure device. The solenoid 193 is preferably energized upon closure of a switch activated off the handpiece to maintain pinch valve 192 in the open position whenever vibrator 179 is in operation.

In summary, when activated, chambers 175 and 177 are immediately pressurized at the low end of the operating pressure range so that the abrasive delivery system is readied for the delivery of a particulate-laden air stream through resilient tube 184 to conduit 172 when desired by the operator. Upon activation of the vibrator and opening of pinch valve 192 by the control circuitry, described hereinafter, particulate material advances upwardly within spiral groove 180 through duct 181 where it enters resilient, flexible tubing 182 and exit tube 183, where it exits container 175 and passes through tube 184 to join conduit 172.

It should be apparent that the amount of abrasive delivered into the air stream is primarily a function of the frequency and amplitude of vibration of the spiral groove 180.

Typically, the vibratory means 179 is an electromagnetic coil system similar to what might be found in an audio speaker. In particular, an oscillating current is provided to a magnetic coil. An armature is placed proximate (e.g., within) the coil. The magnetic field created by the current running through the coil exerts a force on the magnetic armature causing it to move. An AC current in the coil will cause the armature to move back and forth at the AC frequency of the current. The armature is coupled to the vibratory device 179 which, in turn, is mechanically coupled to the helical feed 180, causing it to vibrate.

FIG. 2 illustrates an exemplary drive circuit of the prior art for driving the vibratory device 179. In this typical system, the coil drive circuit consists of a switch 200, rectifier diode 202, a rheostat 204. The driving circuit is powered directly off the AC line power. The switch 200 activates the delivery system. The rectifier diode 202 half-wave rectifies the alternating current. The rheostat 204 steps down the voltage relative to the input voltage to the desired level.

The vibratory feeder drive of the prior art as exemplified by FIG. 2 has significant disadvantages. For instance, the signal to the vibratory device 179 is directly line driven. Accordingly, the voltage and the frequency of the drive signal is not particularly stable. Specifically, as is well known, line power can fluctuate significantly in both voltage and frequency in most parts of the world.

Further, depending on the locality, the line AC frequency can differ. For instance, in the United States, standard AC line power is provided at 60 hertz. However, in Europe, standard AC line power is provided at 50 hertz.

Typically, the chamber 177 is designed and dimensioned to have a resonance frequency at or near the frequency of vibration, i.e., 50 or 60 hertz depending on the power supply of the country for which the device was designed. This provides for stable and large magnitude vibration with small power requirements. Accordingly, a tool optimized to operate at 60 hertz line power will not operate as effectively on 50 hertz power and vice versa since the vibrations will not be as close to the resonance frequency of the vibratory system as it could be.

In the drive systems of the prior art as exemplified by FIG. 2, the vibration frequency is dictated by the local power supply and cannot be altered. Thus, it is difficult to use a single tool in different localities with different line power frequencies.

Accordingly, it is an object of the present invention to provide an improved dental air-abrasive delivery tool.

It is a further object of the present invention to provide an improved drive circuit for driving a vibrator for supplying abrasive into an air stream in a dental air-abrasive tool.

It is another object of the present invention to provide an improved drive circuit for any vibratory apparatus.

It is yet another object of the present invention to provide a drive circuit for a vibratory apparatus which can provide a drive signal of essentially any frequency or voltage regardless of the local power supply.

It is yet a further object of the present invention to provide a drive circuit for a vibratory apparatus which is extremely stable in both voltage/current and frequency.

SUMMARY OF THE INVENTION

In the present invention, a drive circuit for driving the vibrator of a vibratory apparatus is provided with 12 volt DC power. A boost regulator operates as a DC-to-DC voltage converter to boost the voltage provided by the 12 volt DC source to the desired operational voltage. In a preferred embodiment, the circuit is designed to accommodate two vibratory means which can be driven in the alternative. The drive circuit is provided with a switch for selectively providing the alternating current to one or the other vibratory means.

In a preferred embodiment, the DC-to-DC voltage converter steps up the voltage to some level greater than the maximum voltage which may be needed for driving the vibratory means. A potentiometer is provided for each vibratory means to allow for adjustment of the delivery voltage to the vibratory means. The potentiometers allow the user to select the voltage delivered to the vibratory coils.

The output of an oscillator is fed to a divider that can alternately divide by at least two different factors, in order to provide at least two possible drive frequencies.

The return voltage from each of the vibratory means is fed to ground through a transistor which is gate controlled by a first pair of logic gates. These logic gates are driven by an oscillator (as stepped down by the divider to the desired frequency) to switch the transistors on and off at the selected frequency. This operation essentially converts the DC voltage at the output of the boost regulator to an AC drive voltage. In a preferred embodiment of the invention, a flip flop comprising a second pair of logic gates selects which one of the potentiometers will control the drive voltage.

DETAILED DESCRIPTION OF A PREFERRED EMBODIMENT OF THE INVENTION

Figure 1:
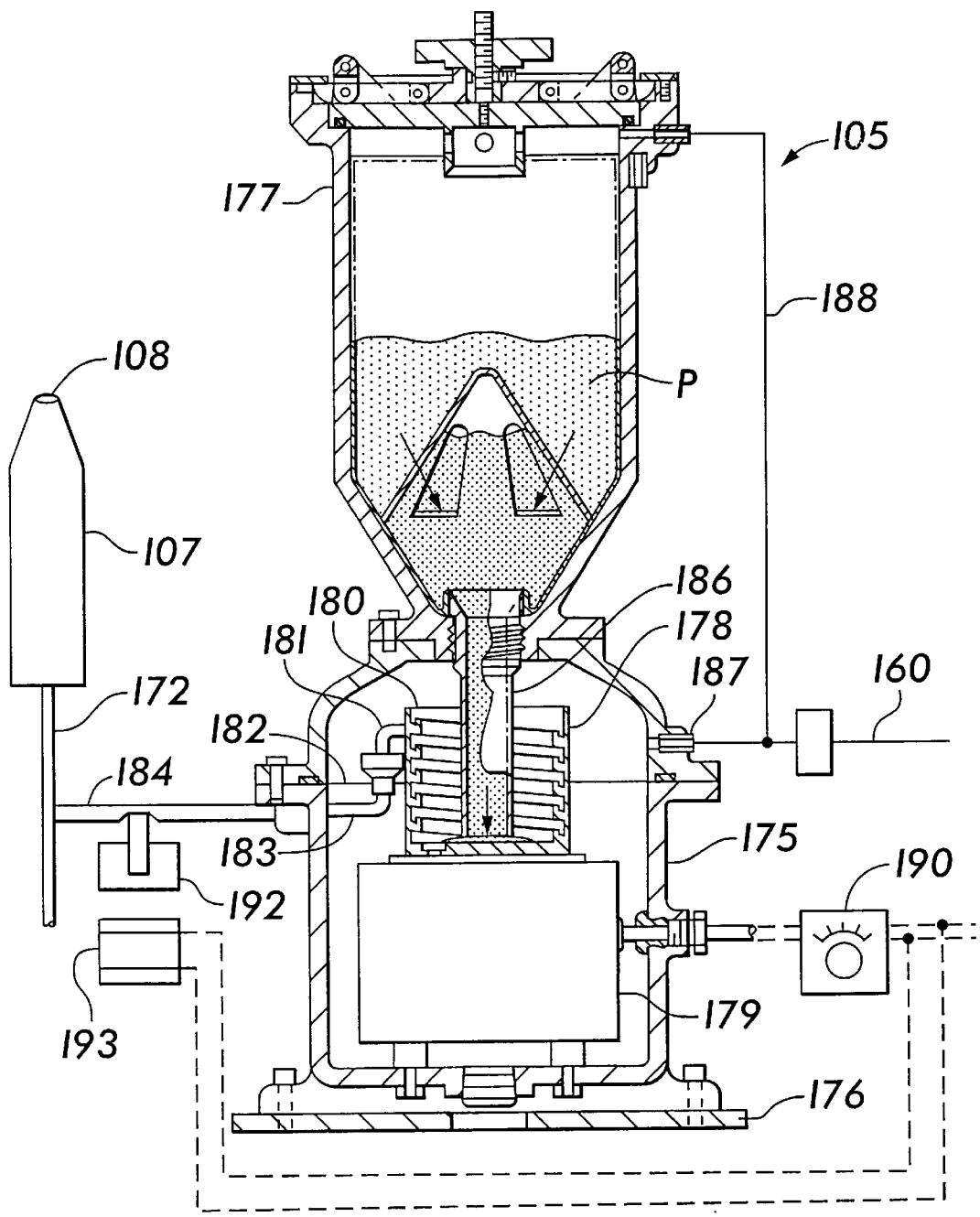
FIG. 1 is a pictorial sectional view of an exemplary abrasive delivery system, including the vibratory device and attendant controls.
Figure 2:
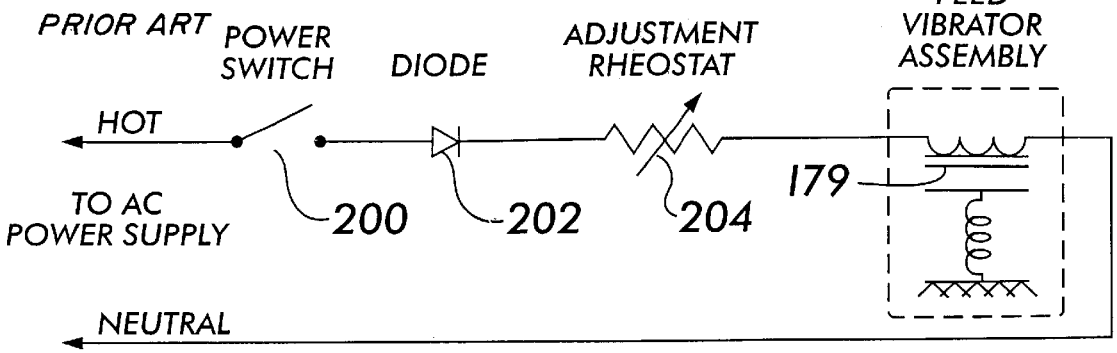
FIG. 2 is a circuit diagram showing an exemplary prior art drive circuit for a vibratory feeder device.
Figure 3:
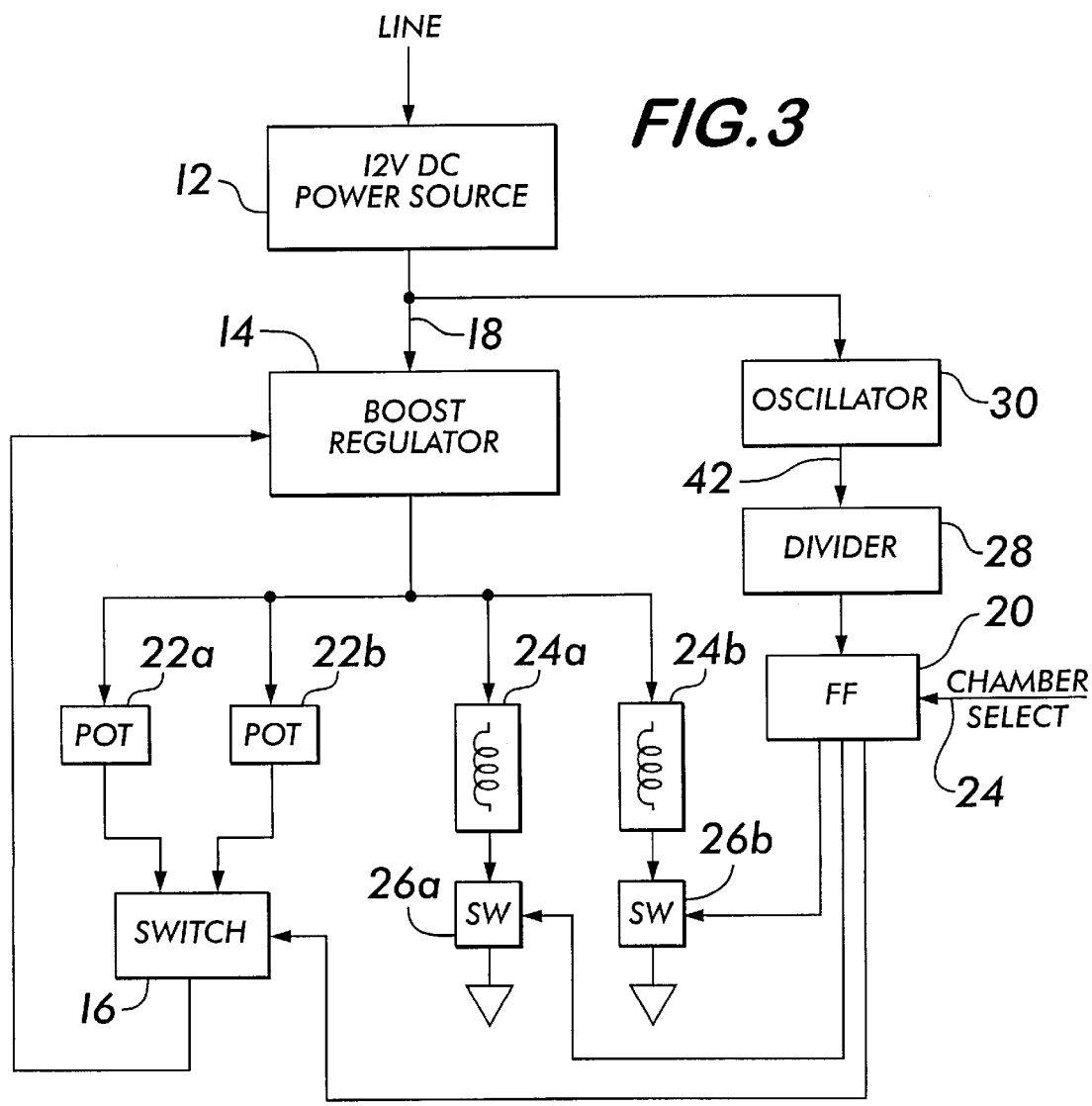
FIG. 3 is a block diagram of a preferred embodiment of the drive circuit of the present invention.

FIG. 3 is a block diagram of an exemplary embodiment of a drive circuit 10 for vibratory coils in accordance with the present invention. The illustrative embodiment is particularly adapted for driving vibratory coils of an air-abrasive dental tool. Further, the illustrative embodiment is designed for an air-abrasive dental tool having two abrasive chambers. Particularly, it is often desirable to utilize abrasive particles having one set of characteristics for a first dental operation and abrasive particles having a second set of characteristics for a second dental operation. Thus, it is preferred that the abrasive delivery system include means for selectively providing either a first abrasive particle or a second abrasive particle for mixing with the fluid stream.

For instance, for tooth etching, it may be desirable to use a relatively coarse abrasive particle, whereas, for tooth cleaning, it may be desirable to use a finer abrasive particle. Accordingly, many dental air-abrasive tools have two separate chamber mechanisms, such as chamber 177 shown in FIG. 3. The first chamber holds the coarse particles and the second chamber holds the fine particles. The dentist/operator is provided with a button or switch for selecting which chamber will deliver particles into the air stream. Accordingly, the particular embodiment illustrated in FIG. 3 has provision to selectively drive one of the two vibratory coils and switching means for selecting between the two based on an external signal.

Twelve volt DC power is provided to the circuit by a line driven DC power source 12. A boost regulator 14 steps up the 12 volts to at least the voltage necessary for driving the vibration coils at the desired amplitude. Preferably, however, the boost regulator 14 steps up the voltage to a voltage higher than the maximum possible desired voltage for driving the coils. Potentiometers 22a and 22b are provided, as described more fully below, to allow the operator to adjust the voltage supplied to the coils.

The stepped up voltage signal 18 is provided to the two potentiometers 22a and 22b. The potentiometers can control the voltage generated by boost regulator 14 and provided to the vibratory coils 24a and 24b. A switch 16 under control of flip flop/pulse train control circuit 20 selectively provides the signal at the voltage tap of one of the two potentiometers to boost regulator 14 in order to set the supply voltage to the coils on line 18. The switch selects the potentiometer tap to be coupled to the boost regulator responsive to an external Chamber Select signal 24.

The path from each of the coils 24a and 24b to ground is interrupted by a transistor switch 26a and 26b, respectively. The switches are controlled by the flip flop/pulse train controller 20 such that one switch is maintained off while the other switch is turned on and off at the selected vibration frequency. The aforementioned operation of the flip flop/pulse train controller 20 and switches 26a and 26b will cause the selected vibration coil to drive the vibrating mechanism at the selected frequency.

The flip flop/pulse train controller 20 is driven by a crystal oscillator 30. As is well known, the crystal oscillator provides an alternating current at a precise fixed frequency, typically on the order of several megahertz. A divider circuit 28 receives the oscillator output and divides the frequency down to the desired level, e.g., 100 to 120 hertz. In a preferred embodiment of the invention, the divider is equipped with a jumper which can be selectively positioned to provide two different division ratios in order to selectively provide for a 100 hertz or a 120 hertz signal into the flip flop/pulse train controller 20.

The selectibility of the division ratio by divider 28 is a feature which is particularly adapted for retro-fitting older tools, some of which may have vibration chambers 177 that operate more effectively at 100 hertz (if the tool was originally designed for European use with a 50 hertz power supply) and others of which may operate more effectively at 120 hertz (if the tool was originally designed for U.S. use with a 60 hertz power supply). By providing the jumper, a single drive circuit unit can be used in either tool.

In the disclosed system, both the supply voltage magnitude and frequency to the coils 24a and 24b can be set at desired values independent of line voltage magnitude or frequency. Further, the voltage and frequency will not be affected by fluctuations in line voltage or frequency.

Figure 4A:
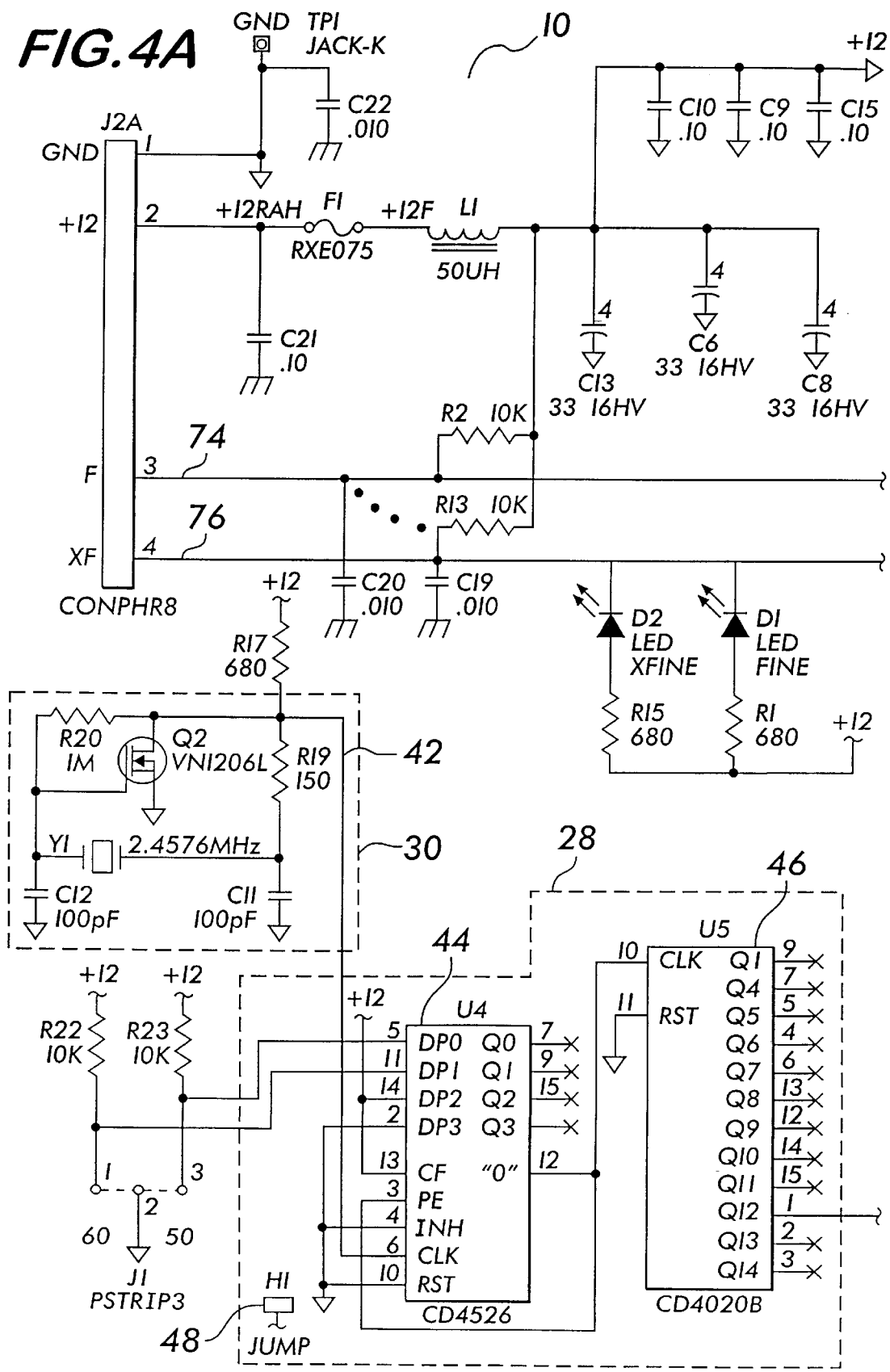
FIG. 4 is a circuit diagram of a preferred embodiment of the drive circuit for a vibratory device of the present invention.
Figure 4B:
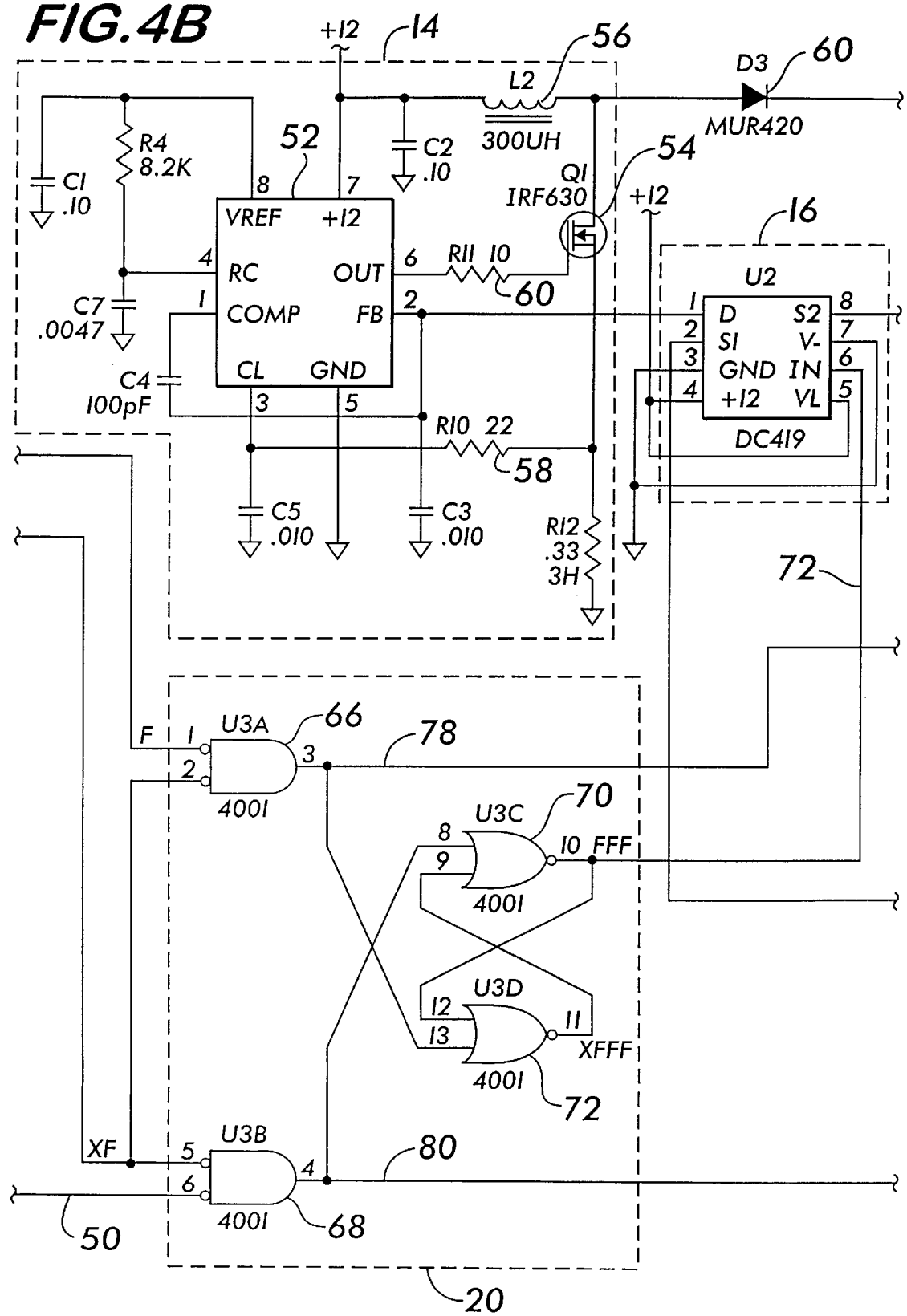

FIG. 4 is a circuit diagram of the preferred embodiment of the device disclosed in FIG. 3. For convenience, the 12 volt DC power source is not shown in FIG. 4. The crystal oscillator circuit 30 outputs a 2.4576 megahertz signal on line 42 to divider circuit 28. Divider circuit 28 comprises two serial dividers 44 and 46. Divider 44 is a divide by 5 or divide by 6 divider. Jumper 48 can be selectively positioned to set the desired division ratio. Divider 44 is followed by a $2^{12}$ divider 46. Accordingly, the divider circuit will step down the 2.4576 megahertz frequency to either 120 hertz or 100 hertz. As stated previously, when the drive circuit 10 is used in conjunction with a tool which has been designed for optimal use at 120 hertz, divider 44 is set to divide by 5. When it is used in connection with a dental tool designed for optimal use at 100 hertz, it is set to divide by 6. The 100 to 120 hertz signal is output to flip flop circuit 20 on line 50.

Turning now to the power for the vibration coils, boost regulator 14 is a DC-to-DC converter. In particular, integrated circuit (IC) 52 is a switching regulator which operates transistor 54. In one preferred embodiment, the IC is a Unitrode UC3843. However, any number of other comparable regulators could be used. In this particular embodiment, the output on pin 6 of the IC 52 drives transistor 54 at high frequency, e.g., approximately 50 kilohertz.

In operation, at the instance transistor 54 turns on, the voltage across inductor 56 is nearly equal to the 12 volt supply provided to its input terminal. The current then rises linearly in inductor 56 until a limit set by IC 52 is reached, which then turns off transistor 54. In particular, the drain current of transistor 54 causes a voltage to appear across resistor 55. Resistor 55 is coupled through resistor 58 to pin 3 of IC 52. When the voltage at pin 3 reaches a pre-determined level, output pin 6 goes low. Output pin 6 is connected through resistor 60 to the gate terminal of transistor 54. Accordingly, when output pin 6 goes low, transistor 54 is turned off. When transistor 54 turns off, the current through inductor 56 then decays through diode 60 into capacitor 62. As the current in inductor 56 decays while transistor 54 is off, the voltage at pin 3 drops progressively until such time as IC 52 turns transistor 54 on again. IC 52 turns transistor 54 on again after a preset delay period. This operation will continue (e.g. at a frequency of about 50 KHz) and the voltage in capacitor 62 will continue to rise each cycle of transistor 54.

The voltage across capacitor 62 is allowed to rise until a second voltage limit set by potentiometer 22a or 22b, depending on whether the first or second chamber has been selected.

In particular, IC 52 will turn off transistor 54 when the voltage at pin 2 reaches a pre-determined level, e.g., 2.5 volts. The voltage that is supplied to pin 2 is a function of analog switch 16, potentiometer 22a or 22b and the voltage across capacitor 62. Specifically, analog switch 16, which, in a preferred embodiment, is an integrated circuit, is controlled by flip flop/pulse train controller 20 to provide to pin 2 of IC 52 the voltage tap from potentiometer 22a or 22b, depending on which chamber is selected. The voltage at the taps of potentiometers 22a and 22b is a direct function of the voltage across capacitor 62. The voltage taps of the potentiometers 22a and 22b are set by the operator to the position that will place 2.5 volts at the tap when the voltage across capacitor 62 is at the desired amplitude for the particular application. This voltage might be different for each potential application of the tool, e.g., cleaning, etching or cutting teeth, and might typically range from 60 to 90 volts.

The voltage across transistor 62 is provided to the vibratory coils (not shown in FIG. 4) through lines 63 and 65. The return paths 67 and 69 from the coils to ground are through transistor 26a and 26b, respectively. These transistors are gate controlled by flip flop/pulse train controller 20 to turn on and off at the desired frequency, e.g., 100 hertz or 120 hertz, to cause the chamber to vibrate at that frequency. Specifically, in a preferred embodiment of the invention, flip flop/pulse train controller 20 comprises a first pair of NOR gates 66 and 68 (shown in the figure as AND-NOT gates) followed by a second pair of cross coupled NOR gates 70 and 72. The cross-coupled NOR gates essentially comprise an RS flip flop. In operation, the chamber is selected by a switch (not shown) operated by the dentist. The switch generates two active low signals 74 and 76, herein termed the fine signal (referring to a first chamber containing fine particles and corresponding to potentiometers 22a, coil 24a and transistor 26a) and the extra fine signal (referring to a second chamber containing extra fine particles corresponding to potentiometer 22b, coil 24b and transistor 26b). When the dentist selects the chamber associated with coil 24a (fine), line 74 goes low while line 76 remains high. When the dentist selects the chamber associated with coil 24b (extra fine), line 74 remains high and line 76 goes low. One input of each of NOR gates 66 and 68 is coupled to receive the signal on line 50. The second input of NOR gate 66 is coupled to the fine signal 74. The second input of NOR gate 68 is coupled to the extra fine signal 76. The outputs 78 and 80 of NOR gates 66 and 68 are provided to the gate terminals of transistors 26a and 26b respectively. Accordingly, if the fine signal 74 is asserted (low), NOR gate 66 will switch transistor 26a on and off at the frequency provided to NOR gate 66 on line 50. The output 80 of NOR gate 68, however, will remain low, since the signal on line 76 will be high. Accordingly, transistor 26b will remain off. When the extra fine signal 76 is asserted low, the opposite is true, namely, transistor 26b is switched on and off at the frequency provided on line 50, while transistor 26a remains off.

Circuit 20 also operates as a flip flop for controlling analog switch 16. In particular, the output signal of NOR gate 70 is provided to the control input of analog switch 16. When the dentist switches chambers, the output 72 of the flip flop 20 into the analog switch 16 will switch from high to low or vice versa, thus causing switch 16 to change states.

The levels of lines 74 and 76 do not switch the flip-flop directly since they are logically inverted. Gates 66 and 68 provide the secondary function of inverting the logic levels of lines 74 and 76 so that they will have the desired polarity for operating the flip-flop correctly. The fact that lines 78 and 80 contain pulses does not affect the above described switching operation of the flip-flop since the first logic high level into the flip-flop causes the flip-flop output signal on line 72 to switch.

The outputs of the NOR gates 66 and 68 control the transistor 26a and 26b to turn on and off at the selected frequency. In turn, this causes the DC current generated by power supply 12, boost regulator 14 and potentiometers 22a and 22b to alternately flow through coils 24a and 24b. This will vibrate the chambers at the selected frequency. Circuit 20 also operates as a flip flop which controls analog switch 16 which selects one of the two potentiometers for supplying the tap volt age which sets the voltage level generated by boost regulator 14.

The circuit 20 also may be looked at as an RS flip flop (cross coupled NOR gates 70 and 72) preceded by NOR gates 66 and 68.

It should be understood that the pre ceding discussion pertains to an exemplary embodiment and that modifications can be made to this particular embodiment while still practicing the present invention. It should also be understood that the dental air-abrasive tool described above is merely an exemplary application for the circuit and that the circuit can be used with or adapted for use with other vibratory devices.

Having thus de scribed a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A circuit for alternately driving first and second vibratory devices, said circuit comprising:
    a direct current power source for providing a voltage to said vibratory devices,
    first and second control switches coupled between said power source and said first and second vibratory devices, respectively,
    an oscillator for generating a pulse train for turning said control switches on and off synchronously with said oscillator so as to create an alternating current in the corresponding vibratory devices, and
    first and second OR gates, said first and second OR gates each having a first input coupled to receive said pulse train from said oscillator and each having a second input coupled to receive first and second signals of opposing polarity, respectively, said first and second signals indicating which of said first and second vibratory devices is selected for operation, and said first and second OR gates each having an output coupled to said first and second control switches, respectively,
    whereby one of said first and second control switches is turned on and off synchronously with said oscillator while the other remains off.

2. A circuit as set forth in claim 1 further including first and second potentiometers coupled to said power source for adjusting the voltage provided to said first and second vibratory devices.

3. A circuit as set forth in claim 2 wherein said OR gates are NOR gates and a logic low level of either of said first and second signals indicates a selection of the corresponding vibratory device.

4. A circuit as set forth in claim 2 further comprising a divider coupled between said oscillator and said control switches for dividing a frequency output by said oscillator so that said pulse train for controlling said control switches has a frequency lower than a frequency of said oscillator.

5. A circuit as set forth in claim 4 wherein said divider is adjustable to select between first and second division ratios.

6. A circuit as set forth in claim 2 wherein said direct current power source further comprises a dc-to-dc converter coupled to said potentiometers for stepping up the voltage from said power source to a higher voltage.

7. A circuit as set forth in claim 6 wherein said first and second control switches are transistors.

8. A circuit as set forth in claim 7 wherein said first and second transistors have gate terminals coupled to said outputs of said first and second OR gates, respectively.

9. A circuit as set forth in claim 2 wherein said direct current power source further comprises a dc-to-dc converter coupled to said first and second potentiometers for stepping up the voltage provided by said power source.

10. A circuit as set forth in claim 8 further comprising;
    a selection switch coupled between said first and second potentiometers and said dc-to-dc converter for selectively providing a voltage tap of one of said first and second potentiometers to said dc-to-dc converter for controlling an amplitude of the voltage provided by said power source, and
    a flip flop having inputs coupled to the outputs of said first and second OR gates and an output coupled to control said selection switch.

11. A circuit as set forth in claim 10 wherein said flip flop comprises an RS flip flop.

12. A circuit for converting a voltage supplied by a DC voltage source to an AC voltage, for driving a selected one of first and second vibratory devices at a selected one of a plurality of AC voltages, said circuit comprising;
    first and second OR gates, said first and second OR gates each having a first input coupled to receive an oscillating signal and each having a second input coupled to receive first and second signals of opposing polarity, respectively, said first and second signals indicating which of said first and second vibratory devices is selected for operation, and said first and second OR gates each having an output coupled to first and second control switches positioned to interrupt a current path from said direct current voltage source through said first and second vibratory devices, respectively, whereby one of said first and second control switches is turned on and off synchronously with said oscillator while the other remains off, and
    an RS flip flop having inputs coupled to the outputs of said first and second OR gates and an output coupled to said switch for selectively coupling one of said control devices to control said voltage.

13. A circuit as set forth in claim 12 wherein said OR gates are AND-NOT gates and a logic low level of either of said first and second signals indicates a selection of the corresponding vibratory device.

14. An air-abrasive dental tool comprising;
    a source of fluid under pressure,
    a source of abrasive particles,
    a current driven vibrator for injecting said abrasive particles into said fluid under pressure in order to create an abrasive laden fluid stream, a nozzle for delivering said abrasive laden fluid stream to a tooth, and a circuit for driving said vibrator, said circuit comprising:

a direct current power source for providing a voltage to said vibrator, a control switch coupled between said power source and said vibrator, and an oscillator for generating a pulse train for turning said control switch on and off synchronously with said oscillator so as to create an alternating current in said vibrator.

15. A tool as set forth in claim 14 further including a potentiometer coupled to said power source for adjusting the voltage supplied to said vibrator.

16. A tool as set forth in claim 15 wherein said direct current power source further comprises a dc-to-dc converter coupled to said potentiometer for stepping up the voltage from said power source.

17. An air-abrasive dental tool comprising;

a source of fluid under pressure, a source of abrasive particles, first and second current driven vibrators for injecting said abrasive particles into said fluid under pressure in order to create an abrasive laden fluid stream, a nozzle for delivering said abrasive laden fluid stream to a tooth, and a circuit for driving said vibrators, said circuit comprising:

a direct current power source for providing a voltage to said vibrators, first and second control switches coupled between said power source and said first and second vibrators, respectively, an oscillator for generating a pulse train for turning said first and second control switches on and off synchronously with said oscillator so as to create an alternating current in said vibrators, and a first selection switch, said first selection switch comprising first and second OR gates, said first and second OR gates each having a first input coupled to receive said pulse train from said oscillator and each having a second input coupled to receive first and second signals of opposing polarity, respectively, said first and second signals indicating which of said first and second vibrators is selected for operation, and said first and second OR gates each having an output coupled to said first and second control switches, respectively, whereby one of said first and second control switches is turned on and off synchronously with said oscillator while the other remains off.

18. A circuit as set forth in claim 17 wherein said first and second control switches are transistors.

19. A circuit as set forth in claim 18 wherein said transistors have gate terminals coupled to said outputs of said first and second OR gates, respectively.

20. A circuit as set forth in claim 19 further comprising;

first and second potentiometers coupled to said power source for adjusting the voltage supplied to said first and second vibrators, respectively, a selection switch coupled between said first and second potentiometers and said power source for controlling an amplitude of the voltage provided by said power source, and a flip flop having inputs coupled to the outputs of said first and second OR gates and an output coupled to control said selection switch.

21. A circuit as set forth in claim 20 wherein said flip flop comprises an RS flip flop.

22. A circuit for driving a vibratory feeder comprising:

a vibratory feed device for feeding particles into a fluid stream, a direct current power source for providing a voltage to said vibratory feed device, a control switch coupled between said power source and said vibratory feed device, and an oscillator for generating a pulse train for turning said control switch on and off synchronously with said oscillator so as to create an alternating current in said vibratory feed device.

* * * * *